(12) United States Patent
Bultan et al.

(10) Patent No.: US 7,197,341 B2
(45) Date of Patent: Mar. 27, 2007

(54) PRECISE SLEEP TIMER USING A LOW-COST AND LOW-ACCURACY CLOCK

(75) Inventors: Aykut Bultan, Bayside, NY (US); John W. Haim, Baldwin, NY (US); Leonid Kazakevich, Plainview, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 161 days.

(21) Appl. No.: 11/000,285

(22) Filed: Nov. 30, 2004

(65) Prior Publication Data
US 2005/0153751 A1    Jul. 14, 2005

Related U.S. Application Data

(60) Provisional application No. 60/531,762, filed on Dec. 22, 2003.

(51) Int. Cl.
*H04B 1/38* (2006.01)

(52) U.S. Cl. ............... 455/574; 455/502; 455/343.2

(58) Field of Classification Search ........... 455/574, 455/502, 343.2, 208, 38.3, 127; 370/311, 370/335; 375/354, 344
See application file for complete search history.

(56) References Cited

U.S. PATENT DOCUMENTS

| 5,594,453 | A | * | 1/1997 | Rodal et al. | 342/357.15 |
|---|---|---|---|---|---|
| 5,943,613 | A | * | 8/1999 | Wendelrup et al. | 455/343.1 |
| 6,016,312 | A | * | 1/2000 | Storm et al. | 370/311 |
| 6,029,061 | A | * | 2/2000 | Kohlschmidt | 455/574 |
| 6,240,304 | B1 | * | 5/2001 | Blankenstein et al. | 455/574 |
| 2003/0153368 | A1 | * | 8/2003 | Bussan et al. | 455/574 |
| 2003/0153370 | A1 | * | 8/2003 | Sako | 455/574 |
| 2004/0116110 | A1 | * | 6/2004 | Amerga et al. | 455/422.1 |
| 2006/0045215 | A1 | * | 3/2006 | Ballantyne et al. | 375/344 |

* cited by examiner

*Primary Examiner*—Matthew D. Anderson
*Assistant Examiner*—Tan Trinh
(74) *Attorney, Agent, or Firm*—Volpe and Koenig, P.C.

(57) ABSTRACT

A wireless transmit/receive unit (WTRU) uses an oscillator providing accuracy for synchronized communications parameters in an active mode, and operates at reduced power during a discontinuous reception (DRX) mode. A real time clock (RTC) is used as the frequency standard during the reduced power operation, and a frequency adjustment is effected while the RTC is used as the frequency standard. By effecting the frequency adjustment, the RTC is able to be used as the frequency standard for substantial time periods, thereby reducing power consumption of the WTRU during the DRX mode.

24 Claims, 6 Drawing Sheets

PRECISE SLEEP TIMER USING A LOW-COST AND LOW-ACCURACY CLOCK

CROSS REFERENCE TO RELATED APPLICATION(S)

This application claims the benefit of U.S. provisional application No. 60/531,762 filed on Dec. 22, 2003, which is incorporated by reference as if fully set forth.

FIELD OF INVENTION

The present invention relates to reference oscillators for wireless communications devices, and more particularly to power consumption control of such reference oscillators.

BACKGROUND

There are algorithms that calibrate a low precision clock with respect to a high precision clock, also referred to as a master clock. This allows a low precision clock to produce timing nearly as precisely as that of the master clock. These techniques have one thing in common—to calibrate the low precision clock periodically with respect to a master clock.

In battery-operated devices such as wireless transmit/receive units (WTRUs) and other mobile devices, it is very important to limit power consumption to extend battery life. Algorithms and hardware in the WTRU should be designed to minimize power consumption. Battery life can also be extended by reducing power consumption during periods of inactivity in which certain functions can be turned-off or operated in some form of reduced-power mode. The UMTS is configured such that a WTRU can operate with reduced functions during periods of inactivity. The WTRU need only occasionally perform certain functions to maintain synchronization and communications with its associated base station while a call or other dedicated connection is not in progress provides the periods of inactivity which can allow the WTRU to minimize its power consumption. This is achieved by the WTRU operating using discontinuous reception (DRX), wherein the WTRU periodically cycles between "sleep" and "wake" periods. During sleep periods, unneeded power-exhausting processes and hardware are turned off. During wake periods, these processes and hardware, needed to maintain synchronization and communications with the associated base station, are momentarily turned back on.

Most handheld WTRUs today include a low precision real time clock (RTC) in addition to the high precision master clock. The master clock is typically implemented using a temperature controlled crystal oscillator (TCXO). The RTC typically consumes much less energy than does a TCXO, making it desirable to use the RTC instead of the TCXO to provide timing functions during DRX. There are, however, four problems with using an RTC for timing during DRX. Firstly, the RTC typically operates at a greatly reduced speed as compared to TCXO (e.g., 32,768 KHz vs. 76.8 MHz). Second, the frequency accuracy of the RTC may be very low compared to that of a TCXO. Third, the frequency drift of the RTC due to different environmental reasons, such as temperature changes, may be greater than that of a TCXO. Fourth, the RTC typically operates asynchronously to the TCXO. For these reasons, a typical RTC is, alone, inadequate to supply timing functions during DRX.

SUMMARY

A WTRU includes a high power consumption, high rate, high accuracy and high stability reference oscillator such as a TCXO and a lower power consumption, lower rate, less accurate and less stable RTC. The TCXO nominally provides timing functions for the WTRU. The RTC itself cannot provide sufficiently precise and accurate timing functions for the WTRU. To minimize power consumption while operating using discontinuous reception (DRX), the TCXO is periodically turned off, during which times the RTC provides timing functions for the WTRU. A method of calibration and synchronization between the TCXO and RTC ensures that the RTC-provided timing functions during DRX are sufficiently precise and accurate.

DETAILED DESCRIPTION OF THE PREFERRED EMBODIMENTS

As used herein, the terminology "wireless transmit/receive unit" (WTRU) includes but is not limited to a user equipment, mobile station, fixed or mobile subscriber unit, pager, or any other type of device capable of operating in a wireless environment. The terminology "base station" includes but is not limited to a Node B, site controller, access point or any other type of interfacing device in a wireless environment. Although some embodiments are explained in conjunction with the third generation partnership project (3GPP) system, they are applicable to other wireless systems.

According to the present invention, a high-power and high-accuracy oscillator is turned-off during sleep mode and an alternative low-power and low-accuracy oscillator, combined with a sleep timer algorithm are used. By using the low-power oscillator, longer battery life can be achieved. Typically, the low-power and low accuracy oscillator operates at orders-of-magnitude lower frequency than does the high-power high-accuracy oscillator. For example, in one exemplary embodiment, a RTC used as a low-power clock operates at industry standard 32.768 KHz. The RTC operates at a reduced speed as compared to the high-power and high-accuracy oscillator. While the use of an RTC is common on handheld WTRUs, this embodiment provides an ability to use the RTC for sleep mode operations.

A sleep timer (ST) algorithm is used to implement DRX timing and allows the main TCXO to be turned off. To reduce the power consumption of the WTRU in standby, the TCXO may be shut down during the sleep periods of DRX. When the TCXO is turned off, a low-power crystal oscillator or RTC is used to control DRX timing until the TCXO is powered up again. For this purpose, an industry standard quartz crystal based real time clock or other standard clock circuit is used as an RTC. The RTC is combined with a sleep timer algorithm, which overcomes the problems in using the RTC in the DRX mode. The use of a sleep timer algorithm resolves these two problems by applying frequency measurement and scheduling. The RTC can be any suitable oscillator or clock. This does not change the algorithm; only its parameters.

The application of the invention is described in context of DRX, which is explicitly provided for in the UMTS standard. However, the invention can work for a WTRU that has a sleep mode independent of the standards, for example, an embodiment for DRX and another embodiment for a non-standards-based sleep period.

Figure 1:
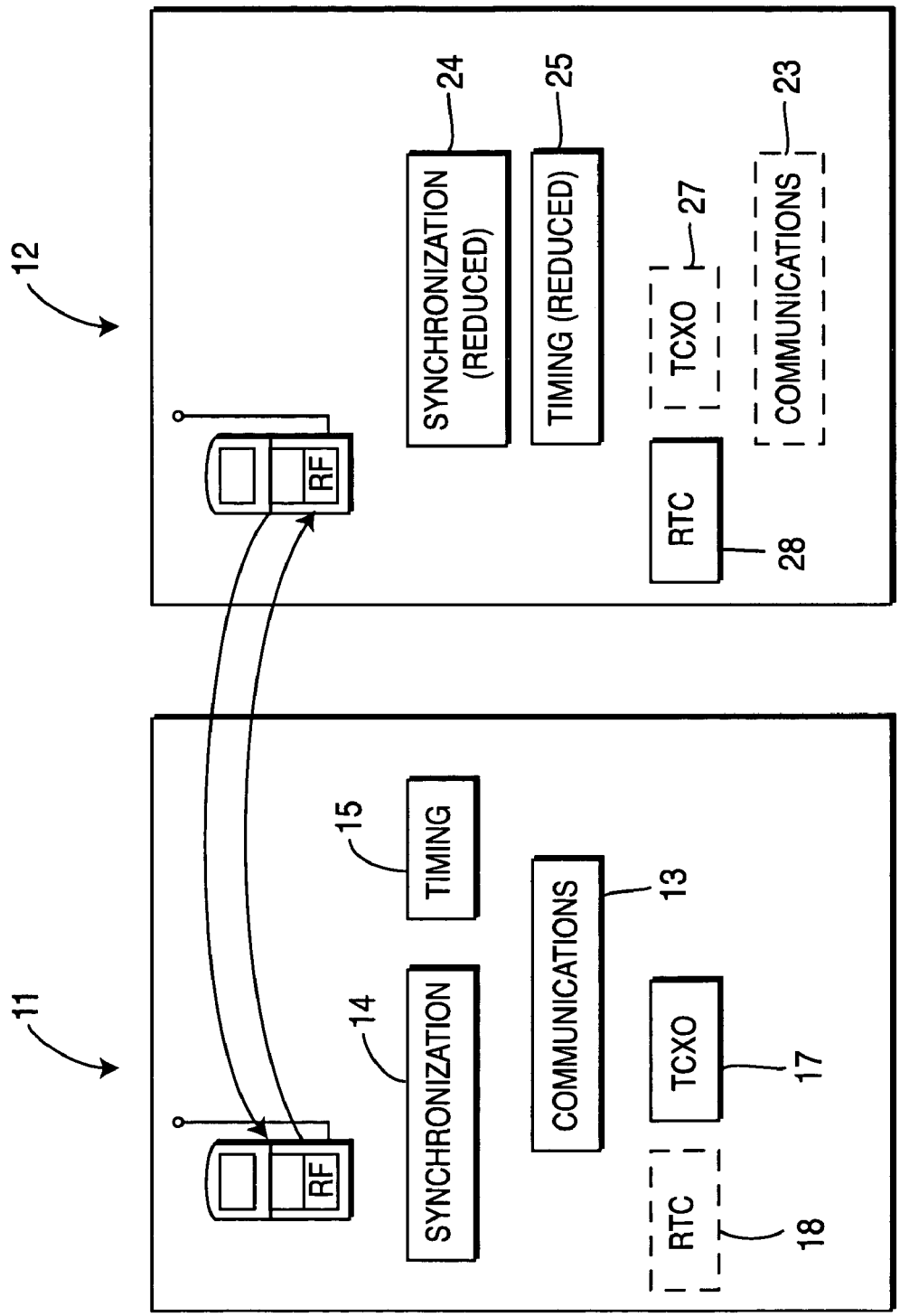
FIG. 1 is a flow diagram showing the operation of a WTRU in active 11 and DRX 12 modes of operation.

FIG. 1 is a flow diagram showing the operation of a WTRU in active 11 and DRX 12 modes of operation. In the active mode 11, the WTRU provides full communication functions, represented by communication device 13. While there are modes of power savings during portions of communication frames, in general, the WTRU has its synchronization by a synchronization device 14 and timing by a timing device 15 fully operational, actively using the TCXO 17. The RTC function, as performed by RTC device 18, may be operating, but the communications device 13 relies primarily on the TCXO 17.

When the WTRU is in the DRX mode 12, the synchronization and timing functions are present as illustrated for synchronization device 24 and timing device 25 but at a reduced level. The WTRU must be able to recognize an event which requires active mode of operation, and maintains communications by a communication device 23 to a limited extent. This is accomplished with a reduced synchronization and timing capability. This reduces the need for the use of the TCXO 27, and makes it possible to rely on the RTC 28. FIG. 1 represents different modes of operation of the same device, and so the physical components of the illustratively different TCXOs 17, 27 and the RTCs 18, 28 are performed by the same physical devices.

The operations executed during the sleep mode include looking for the paging channel, performing cell reselection measurements and checking the user activity. If there is a page, the WTRU leaves the sleep mode and enters the active mode as will be described.

The sleep timer is able to control its active and DRX components and entering into synchronization update in accordance with an algorithm. The sleep timer algorithm includes an active cycle component, generally consistent with active cycle operation and a DRX component and consistent with DRX operation. In the active cycle, the active cycle component maintains operation under the TCXO and maintains an ability to transfer operation to the RTC.

The active cycle component includes a sync update, and a determination of whether the WTRU should enter the DRX mode. This determination of whether the WTRU should enter the DRX mode is made in accordance with predetermined criteria of inactivity. Examples of criteria for entering the DRX mode include termination of a conversation, inactivity for a predetermined period of time, a predetermined time period of cell search activity without locating an adequate signal and a predetermined number of consecutive unsuccessful cell search attempts. The specific criteria are a function of the WTRU.

In a particular embodiment, an RTC frequency measurement is performed. However, the RTC frequency measurement can be avoided because this may be performed in the DRX component. The WTRU enters the DRX mode when a period of relative inactivity is identified by the WTRU at determination.

In the DRX component, an RTC frequency measurement is performed on a periodic basis in order to maintain the synchronization, and a determination is made as to whether to return to the active mode.

Figure 2:
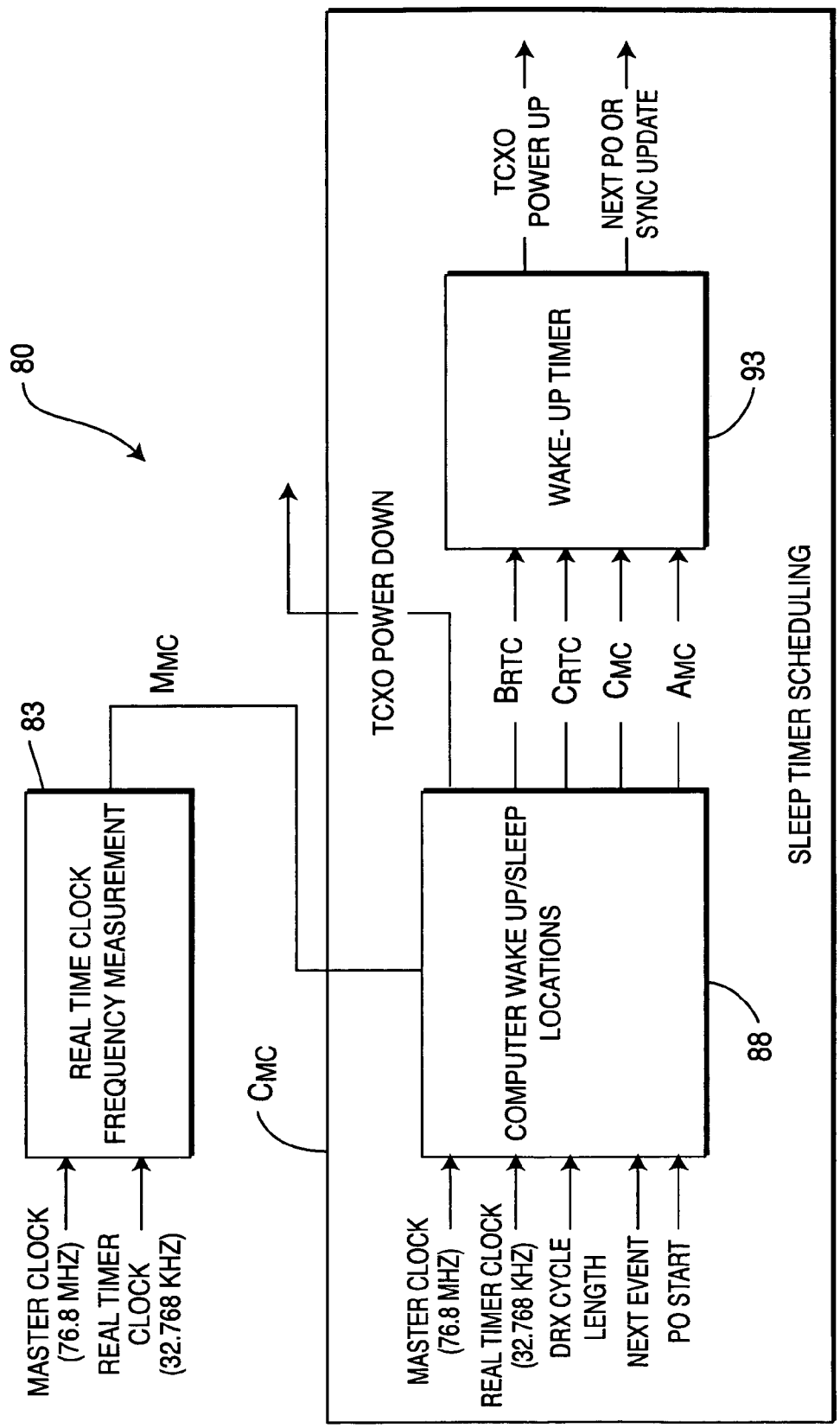
FIG. 2 is a block diagram of input and output signals used by a sleep timer algorithm.
Figure 3:
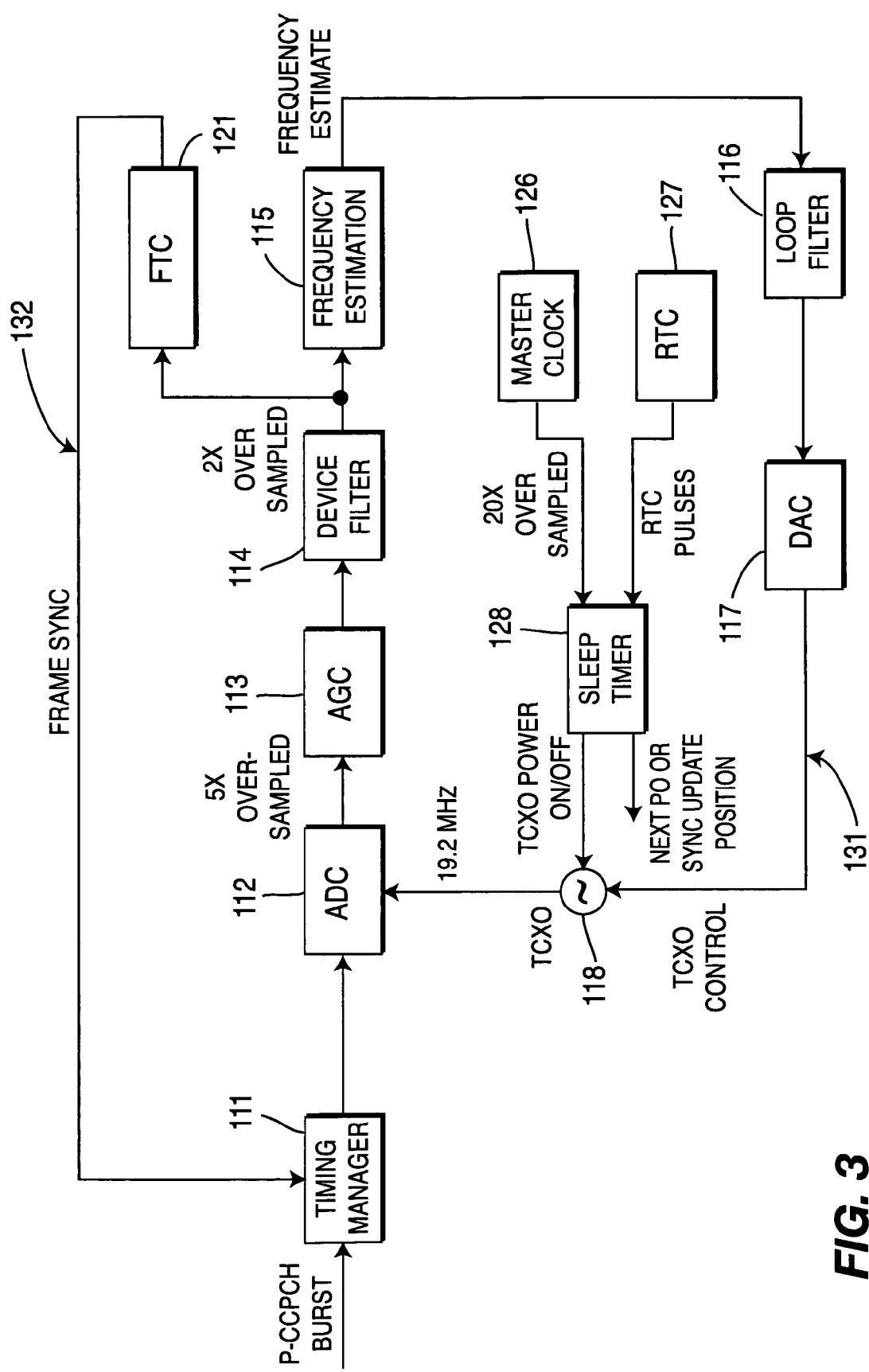
FIG. 3 is a block diagram showing the interaction of the sleep timer with the other receiver synchronization algorithms.
Figure 4:
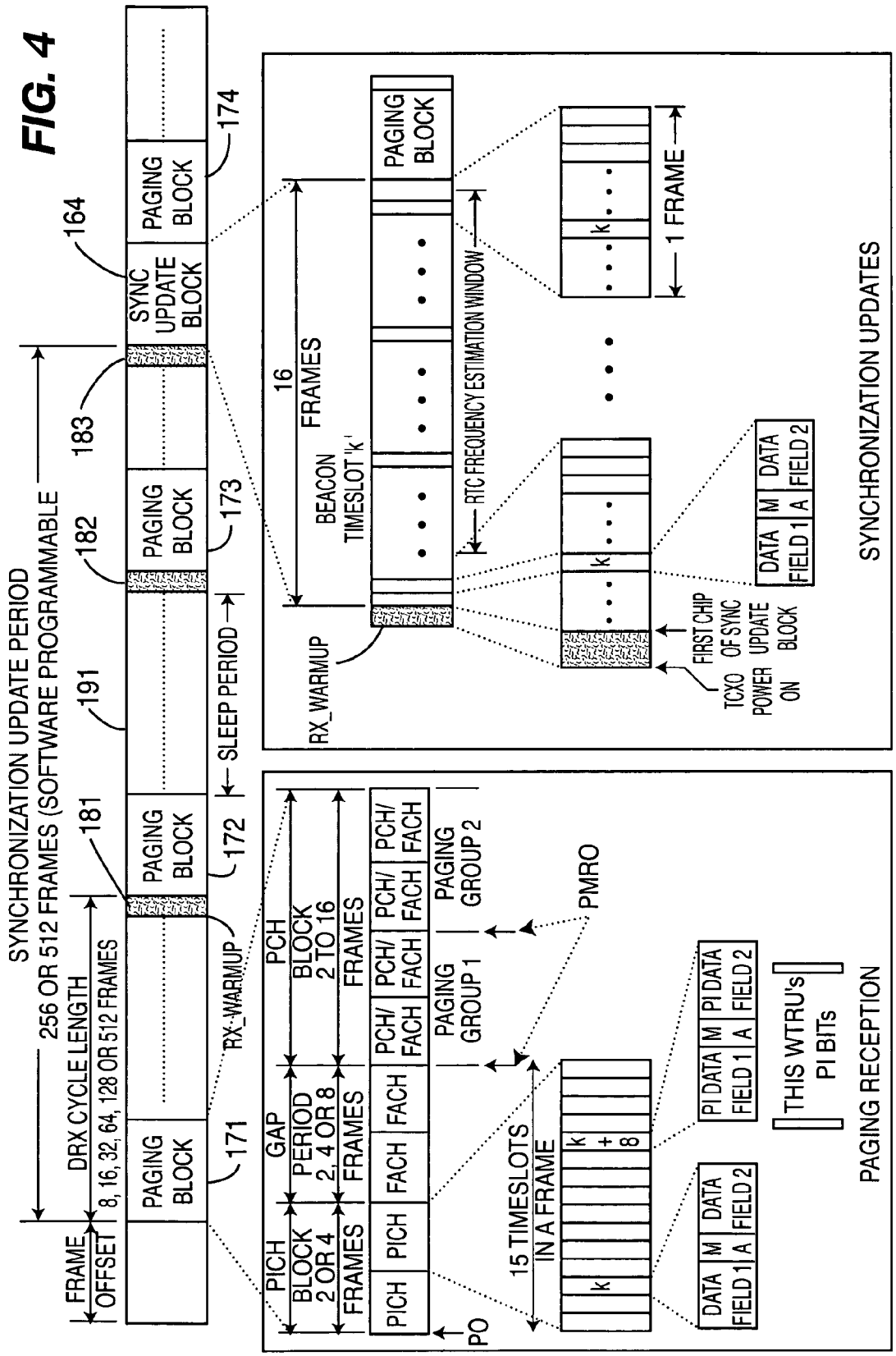
FIG. 4 is a timing diagram for Layer 1 processing.

The components of FIGS. 3 and 4 may be implemented using an integrated circuit, such as an application specific integrated circuit (ASIC), multiple ICs, discrete components, or a combination of IC(s) and discrete components. FIG. 2 is a block diagram of input and output signals used by the sleep timer algorithm 80. The master clock and the DRX Cycle Length are the inputs to obtain an RTC frequency measurement 83. Computations 88 is then executed for wake up and sleep locations, which in turn is used to generate wake up times 93. TCXO Power Up, TCXO Power Down and the next paging occasion (PO) or Sync Update are the outputs of the algorithm 80.

The interaction of the sleep timer with the other receiver algorithms is shown as a block diagram in FIG. 3. The sleep timer is itself controlled in accordance with the sleep timer process which is described hereinafter. The block diagram of FIG. 3 shows interaction of the sleep timer with the other receiver synchronization process. The components include a timing manager 111, an ADC circuit 112, an AGC circuit 113, a receive filter circuit 114, a frequency estimation circuit 115, a loop filter 116, a digital to analog converter (DAC) 117 and TCXO 118. Also shown is a frame timing correction (FTC) circuit 121, and master clock 126, RTC 127 and a sleep timer 128. This circuit implements an algorithm responsible for acquiring and maintaining the frame synchronization of the receiver. The ADC circuit 112, AGC circuit 113, a receive filter circuit 114, frequency estimation circuit 115, loop filter 116, DAC 117 and TCXO 118 form a frequency estimation loop 131. The timing manager 111, ADC circuit 112, AGC circuit 113, a receive filter circuit 114 and FTC circuit 121 provide a frame synchronization loop 132. In this particular embodiment, the sleep timer 128 receives signals from the master clock 126 and the RTC 127, which in turn provides signals to power the TCXO 118 on and off.

The inputs are as follows: 1) Master clock (MC) such as having a 76.8 MHz (20× chip rate) nominal frequency; and 2) RTC such as having a nominal frequency of 32,768 Hz. The control aspects are as follows: 1) DRX Cycle length in terms of frames is provided as an input to the algorithm; 2) Next Event is binary input which is either Paging Block or Sync Update Block; and 3) PO Start is the first MC pulse of a PO.

The outputs are as follows: 1) TCXO Power Down indicates when the TCXO power should be turned off; 2) TCXO Power Up indicates the TCXO power up time in terms of RTC pulses; and 3) Next PO or Sync Update Position: Depending on the paging block considered the next wake-up time might be either a PO or a sync update period. This output shows the beginning of these events in terms of MC pulses (20× chip rate).

The operations executed during the sleep mode are to look for the paging channel, perform cell reselection measurements and check the user activity. If there is a page, the WTRU leaves the sleep mode and enters the active mode. Cell reselection is a continuous process of measuring the strongest cell at any given time during the paging blocks as shown in FIG. 4.

FIG. 4 is a timing diagram for Layer 1 processing in the DRX mode. The sleep timer works during the DRX cycles.

The algorithm has two different parts working at different rates. The first part is the RTC frequency measurement. This part of the algorithm operates during every sync update period, which is shown in FIG. 4. Frequency measurement also operates just before the WTRU goes into DRX cycle. The second part of the algorithm is responsible for indicating the PO or Sync Update position. This part operates for every PO during DRX cycles. This two part algorithm is considered to be a computationally very efficient algorithm, although other algorithms may be used.

In the particular example shown by the diagram, a frame offset is followed by a synchronization update period, which is followed by a sync update block 164. A series of paging blocks 171–174 are shown. Several RX warm-up periods 181–183 are shown, which usually precede other activities such as paging blocks 172, 173 or sync update block 164. Sleep periods, such as sleep period 191, precede the RX warm-up periods 181–183. The synchronization update period 162 precedes the sync update block 164.

RX_WarmUp is a parameter which is used to turn on the TCXO approximately 5 msec earlier to allow for TCXO warm up. It is approximately equal to the number of MC (20×) pulses in 5 msec. The number in this embodiment is set to 384,000.

DRX is intended to identify periods of relative inactivity, which provides opportunities to conserve battery power by powering down various onboard components in the WTRU and going to "sleep". The WTRU is informed of occasions when it must wake up to receive transport information.

DRX is used in idle mode and in the CELL_PCH and URA_PCH states of connected mode. During DRX, the WTRU must wake up on POs as directed by the RRC (Radio Resource Controller) based on system information settings. A PO indicates the beginning of a Paging Block. RRC is responsible for scheduling when, how long and on which channel Layer 1 must listen for each of these procedures. The time difference between two POs for a specific WTRU is called DRX cycle length.

One PO corresponds to one paging block. A Paging Block consists of several frames and contains: 1) paging indicator channel (PICH) block consisting of 2 or 4 frames of Paging Indicators (PIs); 2) gap period consisting of 2, 4, or 8 frames where physical resources can be used by other channels; and 3) paging channel (PCH) block consisting of 2 to 16 frames of paging messages for one to eight paging groups.

When DRX is used, a given WTRU only needs to monitor one PI in one PO per DRX cycle. The timing diagram of Paging Blocks is shown in FIG. 4. DRX cycle lengths may vary from 8 to 512 frames, as in idle mode, the possible DRX cycle lengths are 0.64, 1.28, 2.56 and 5.12 seconds; and in CELL/URA_PCH states, the possible DRX cycle lengths are 0.08, 0.16, 0.32, 0.64, 1.28, 2.56 and 5.12 seconds.

The WTRU should update its frame and timing synchronization periodically during DRX to be able to successfully read PIs and perform cell reselection measurements. Therefore, periodic DRX activities for Layer 1 include cell reselection and the related measurements, monitoring PIs; and maintaining frame and timing synchronization.

If the WTRU detects that it is paged through the related PI, it reads the PCH to access the paging message. Otherwise, it returns back to sleep.

If the TCXO runs continuously, it will consume 2.0 mA maximum current from a 3.0 V nominal DC power supply or 6.0 mWatts of power. For extra power savings, TCXO may be shutdown during DRX sleep periods. When the TCXO is shutdown, the sleep timer is used to schedule wake-up times for the TCXO for the POs or the beginning of the sync update periods. The power consumption of the RTC is typically insignificant compared to the TCXO, in the order of 1 microampere from 3 V DC supply or 3 microwatts.

There are three problems associated with using the RTC. Firstly, the resolution of the RTC does not satisfy the requirements of some wireless systems, such as wideband code division multiple access (W-CDMA) time division duplex (TDD) mode. The typical frequency of RTC is 32,768 Hz. This corresponds to a minimum resolution of 30.52 microsecond or 117.19 chips or 2,343.8 of 20× samples (76.8 MHz). The second problem is the frequency accuracy of the RTC. The operating frequency of the RTC may be different than the nominal frequency up to a maximum deviation of 100 ppm. Third, the frequency stability of the RTC can be low. For this problem, it is assumed that the drift rate would not be faster than [+/−]0.3 ppm per minute or 0.005 ppm per second. This rate is typically the worst case for a room temperature crystal oscillator (RTXO), which uses a specially cut crystal for less temperature sensitivity. Since these oscillators do not have special casings as is the case with TCXO, they are lower in cost.

The sleep timer algorithm consists of two parts: RTC frequency measurement and the sleep timer scheduling. The frequency measurement is performed periodically during the DRX cycles to overcome the problems of frequency accuracy and the frequency stability. The scheduling part meets the resolution requirements of the WTRU to accurately schedule DRX events when the TCXO is shut down.

There is no frequency correction necessary for the RTC. It is only necessary to accurately measure the frequency of the RTC. There is no need to make RTC frequency measurement in the active connected mode, since the TCXO is ON all of the time. RTC frequency measurement is required just before going into DRX cycles and during the DRX. The update rate should be such that the total frequency accuracy should be around 0.1 ppm.

The sleep timer algorithm interacts with the timing manager function. The Next PO or Sync Update output identifies to the timing manager the MC pulse that is coincident to the start of the PO or Sync Update following a wakeup. The PO Start input from the Timing Manager identifies to the sleep timer algorithm the start of a PO following a wakeup. If FTC changes frame timing after a Sync Update, the indicated PO Start Time is with respect to the updated timing.

Figure 5:
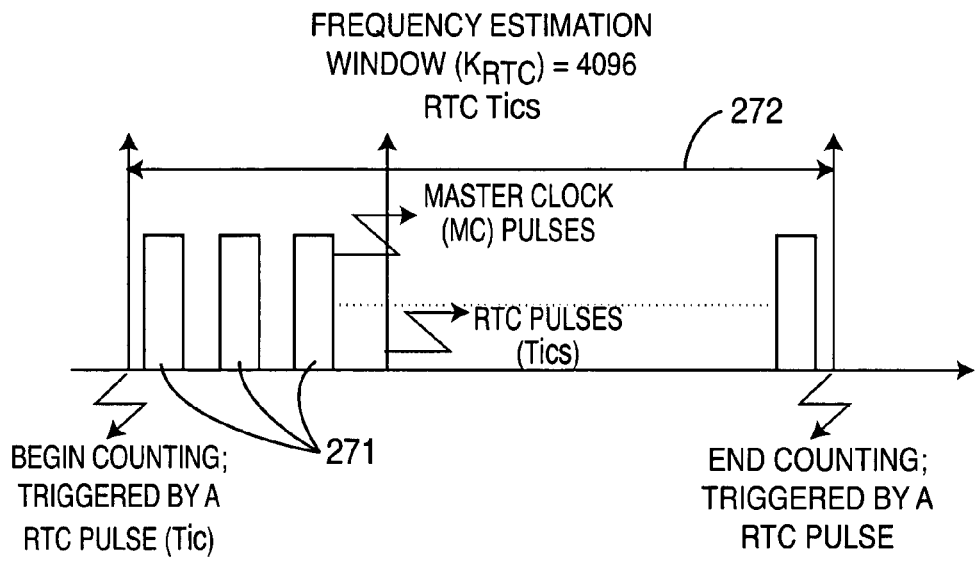
FIG. 5 is a diagram of an RTC frequency estimation window.

The sleep timer algorithm compares real time clock frequency measurement and sleep timer scheduling. Regarding real time clock frequency measurement, FIG. 5 is a timing diagram of an RTC frequency estimation window, in accordance with the present invention. To measure the frequency of the RTC accurately the number of master clock pulses 271 is counted over a long period 272 of time. Master clock has a frequency of 76.8 MHz, which is 20× chip rate. Since this clock is phase locked to TCXO, its worst accuracy is 0.1 ppm. Since there is no correction to RTC, the accuracy of TCXO does not affect the RTC frequency measurement accuracy. As a result, RTC frequency measurement accuracy can be increased as much as required by increasing the frequency estimation window size. For an RTC frequency estimate accuracy of 0.1 ppm, 10 million master clock (MC) pulses 271 must be counted.

When the frequency estimation window length is selected as 4096 RTC pulses ("tics"), it includes 9,600,000 MC pulses for the nominal RTC frequency of 32,768 Hz and master clock frequency of 76.8 MHz. The frequency estimation window beginning and end are both triggered by RTC pulses 271. A start of an RTC pulse 271 initiates the MC pulse counting. At the start of 4096th RTC pulse 271, the MC counting is stopped, and the MC counter value is used for frequency estimation.

The frequency estimation window lasts approximately 125 ms or 13 frames. In active connected mode this frequency estimate is not performed, except just before going into DRX cycles. In that case, the frequency measurement takes place anywhere in the last 100 frames before going into DRX cycles. During DRX cycles, the frequency measurement is performed inside each sync update period. The frequency measurement and processing should occur in the last 13 frames of sync update periods, such that the TCXO has the maximum possible time in which to settle. The updated frequency estimate is used in the next paging block.

Figure 6:
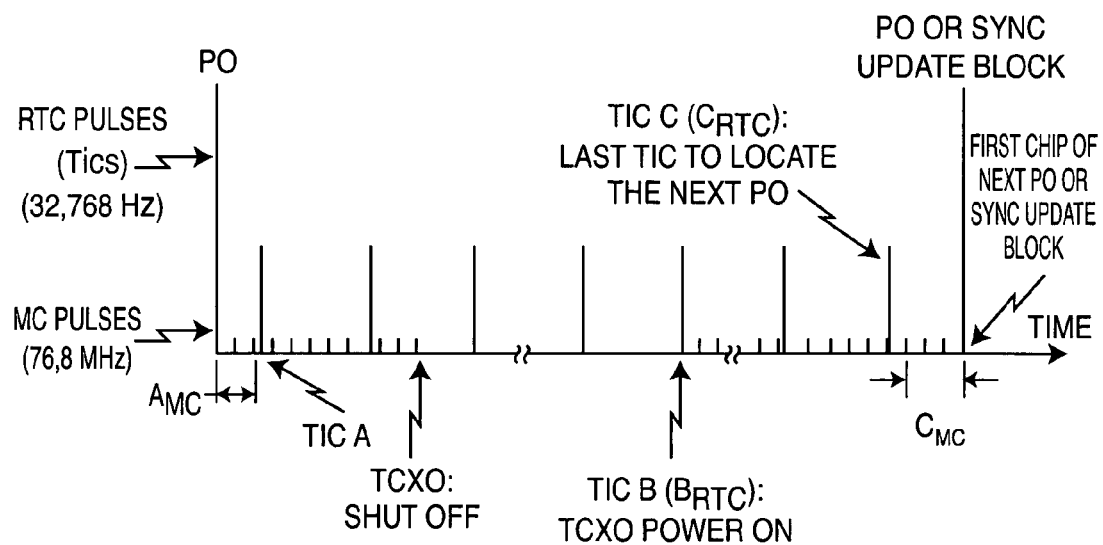
FIG. 6 is a timing diagram for events for sleep timer scheduling.

Regarding sleep timer scheduling FIG. 6 is a timing diagram showing the sleep timer scheduling. The sleep timer determines two periodic events for each DRX cycle; the time of the next wake up for the TCXO; and the time (specific MC pulse) of the next PO or the beginning of the next sync update block, whichever is the Next Event. To locate these events in the absence of TCXO there is one measurement and several processes to apply for simple counting operations. In FIG. 6 below, the timing diagram for events is shown.

TIC A: First RTC Tic after a PO.

TIC B=$B_{RTC}$: The RTC tic where the TCXO is powered up. $B_{RTC}$ specifies the number of RTC tics from the beginning of PO (calculated every sync update or DRX cycle length change).

TIC C=$C_{RTC}$: The RTC tic in the DRX period used to locate the next PO or the beginning of the Synchronization Update Block (calculated per sync update).

$K_{RTC}$(=4096): The period of the frequency estimation window in terms of the number of RTC tics (constant).

DRXP: This parameter indicates the distance from the current PO to the Next Event in terms of frames. It has different values depending on the Next Event input and DRX cycle length, which are given in Table 1.

$K_{MC}$: The number of MC (20×) pulses per DRX period (tabulated for all DRX cycle lengths).

$K_{RTC}$: The number of RTC pulses used during frequency estimation, which is set to 4096.

$M_{MC}$: The measured number of MC pulses in RTC frequency measurement window (measured every synchronization update period).

$A_{MC}$: The measured number of MC pulses from the beginning of the current PO to Tic A (measured per DRX cycle).

$B_{RTC}$: Wake-up time of the TCXO in terms of RTC pulses, which is approximately equal to 5 msec (expressed as 164 RTC tics), before the start of the next PO or Sync Update Block.

$C_{MC}$: The calculated number of MC tics from $C_{RTC}$ (Tic C) to the beginning of the next paging block or sync update block. The beginning of $C_{MC}$ pulse is approximately the same time as the beginning of the first chip of the next Paging Block or Sync Update Block.

At the start of each paging block the time of the next wake up is computed. This is done as follows: 1) measure the number of MC pulses, $A_{MC}$, from the PO to the next RTC pulse (TIC A); 2) find DRXP from Table 1; and 3) compute $B_{RTC}$, $C_{RTC}$ and $C_{MC}$ using the formulas in Equation.

Figure 7:
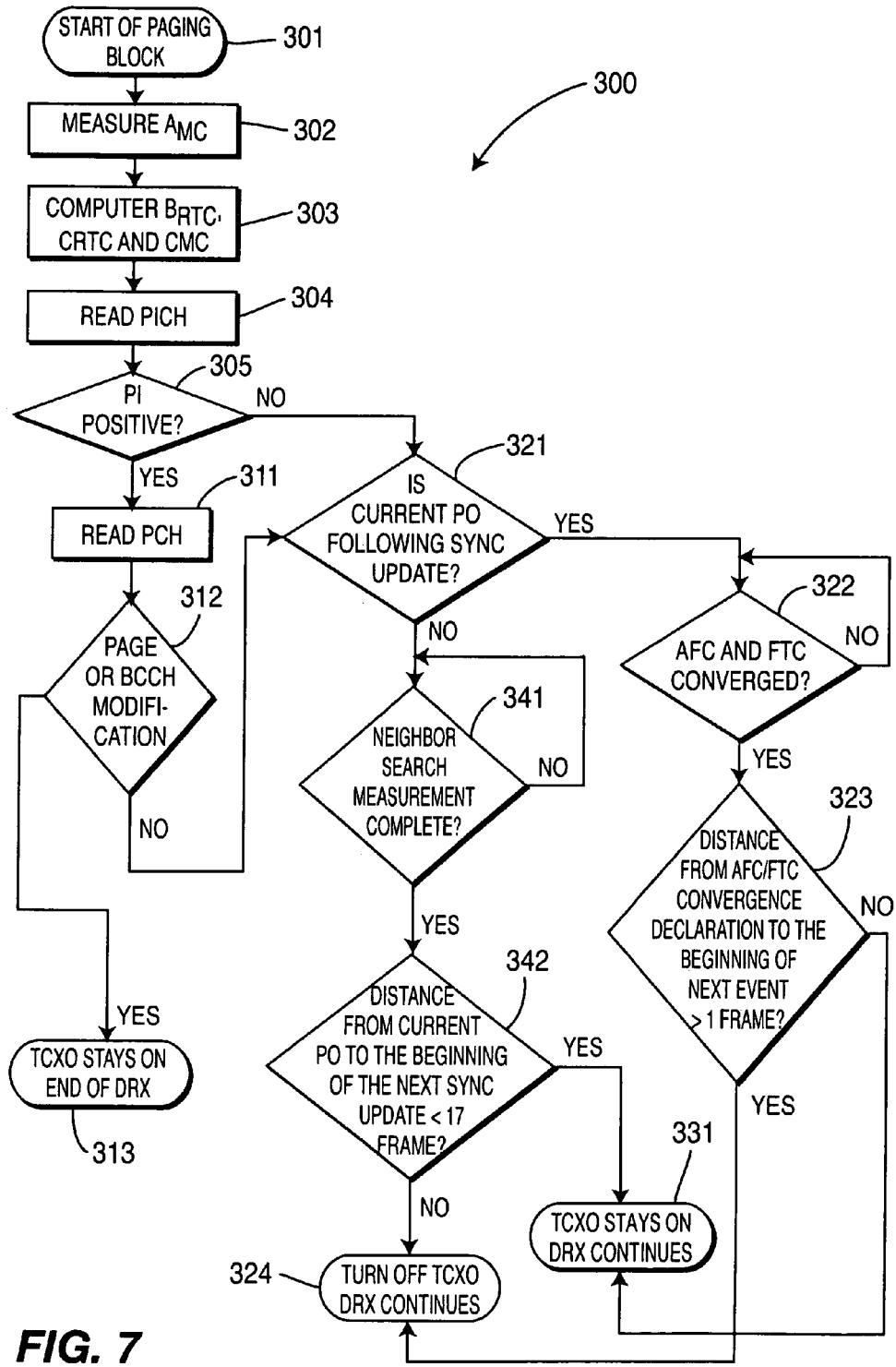
FIG. 7 is a flow diagram for the oscillator shutdown procedures during DRX.

FIG. 7 is a flow diagram 300 for the TCXO shutdown procedures during DRX. A start of a paging block (step 301) is followed by Measuring of AMC (step 302), followed by computation of BRTC, CRTC and CMC (step 303). These computations are followed by a read of PICH (step 304), followed by a determination if a paging indicator (PI) is positive (step 305). If PI is positive, either the WTRU is paged or there is a change in some settings as indicated by the BCCH. Therefore, if PI is positive the WTRU will read the PCH channel to find out what the PI positive refers to. If PI is positive, PCH is read (step 311), and a determination is made as to whether the data read from the PCH indicates a paged or BCCH modification (step 312). If the data read from the PCH indicates a paged or BCCH modification as determined in step 312, the TCXO stays on, or the DRX mode is ended (step 313). If PI is not positive as determined in step 305, or the PCH does not indicate a paged or BCCH modification as determined in step 312, a determination is made as to whether the current PO correctly follows a sync update (step 321). If the current PO correctly follows a sync update, the process waits until automatic frequency control (AFC) and frame timing correction (FTC) are converged (step 322), and when AFC and FTC are converged determines if the distance from AFC/FTC convergence declaration to the beginning of the next event is greater than 1 frame (step 323). If the distance from AFC/FTC convergence declaration to the beginning of the next event is greater than 1 frame, the TCXO is turned off and DRX mode continues (step 324). If the distance from AFC/FTC convergence declaration to the beginning of the next event is not greater than 1 frame as determined in step 323, the TCXO stays on but the DRX mode continues (step 331).

If the current PO does not follow a sync update, as determined in step 321, neighbor search measurements are made until complete (step 341), and a determination is made as to whether the distance from the current PO to the beginning of the next sync update is less than 17 frames (step 342). If the distance from the current PO to the beginning of the next sync update is not less than 17 frames, the TCXO is turned off and DRX mode continues (step 324). If the distance from the current PO to the beginning of the next sync update is less than 17 frames, the TCXO stays on but the DRX mode continues (step 331).

In operation, the next sleep timer event is to schedule TCXO turn off, which is outlined in the flowchart. As seen in the flowchart, there are three final cases of scheduling per DRX cycle: 1) the TCXO is shutdown, the WTRU stays in DRX and the sleep timer algorithm is applied; 2) the TCXO stays ON due to conditions shown in the flowchart and the WTRU stays in DRX. The clock reference used is TCXO and the sleep timer algorithm is not used; and 3) the TCXO stays ON and the WTRU must leave DRX. In this case, the WTRU has been paged or BCCH modification information is present.

TABLE 1

| DRX Cycle Length (frames) | Next Event | $DRX_P$ (frames) |
|---|---|---|
| 32, 64, 128, 256, 512 | Paging Block | DRX Cycle Length |
|  | Sync Update Block | DRX Cycle Length - 16 |
| 8, 16 | Paging Block | DRX Cycle Length |

TABLE 1-continued

DRX$_P$ vs. Next Event

| DRX Cycle Length (frames) | Next Event | DRX$_P$ (frames) |
|---|---|---|
| | Sync Update Block | N/A (*) |

(*) The TCXO is already ON for this case as explained above.

The final step of the process is the wake up for the Next Event. The wake-up process is as follows: 1) turn on the TCXO at time B$_{RTC}$, the B$_{RTC}$ pulse after the last PO; 2) wait until the time C$_{RTC}$; 3) count C$_{MC}$ master clock pulses beginning from C$_{RTC}$; 4) at the C$_{MC}$ master clock pulse, the time is approximately the same as the beginning of the Next Event, i.e., the first chip of the first time slot of the Next Event; and 5) repeat the process for each DRX cycle until the WTRU goes out of DRX cycles.

One advantage of the invention is that it implements a very simple process, which avoids a requirement for actual clock calibration. The timing accuracy can be controlled by changing the length of the measurement period or the frequency of the reference clock. The simplicity comes from the fact that, this embodiment of the process does not calibrate the low accuracy clock but just measures its frequency.

What is claimed is:

1. Method of operating a wireless transmit/receive unit (WTRU), the method comprising:
   providing a reference oscillator for synchronized communications;
   providing a real time clock (RTC);
   providing an active mode of operation and a low power mode of operation;
   using the reference oscillator during the active mode and selectively using the reference oscillator during the low power mode;
   using the RTC during the low power mode; and
   during the low power mode, using the reference oscillator to perform a synchronization update, determining a difference between completion of the synchronization update and a next process requiring use of the reference oscillator and turning off the reference oscillator if the determined difference is greater than a selected threshold.

2. The method of claim 1 where wireless communication is conducted in formatted timeframes wherein the low power mode includes discontinuous reception (DRX), the completion of the synchronization update is the convergence of automatic frequency control (AFC) and frame timing correction (FTC) and the selected threshold is one timeframe.

3. The method of claim 2, wherein:
   the reference oscillator functions as a high-power and high-accuracy oscillator;
   the RTC functions as an alternative oscillator in the DRX mode; and
   a sleep timer algorithm implements DRX timing and controls the active and low power modes of operation so as to accomplish said using the reference oscillator during the active mode and selectively using the reference oscillator during the low power mode.

4. The method of claim 1 comprising during the low power mode, using the reference oscillator to perform cell reselection measurements, determining a difference between completion of the cell reselection measurements and a next process requiring use of the reference oscillator and turning off the reference oscillator if the determined difference is greater than a selected threshold.

5. The method of claim 4 where wireless communication is conducted in formatted timeframes wherein the completion of the synchronization update is the convergence of automatic frequency control (AFC) and frame timing correction (FTC), the selected threshold for the difference between completion of the synchronization update and a next process requiring use of the reference oscillator is one timeframe and the selected threshold for the difference between completion of the cell reselection measurements and a next process requiring use of the reference oscillator is seventeen timeframes.

6. The method of claim 1 comprising using a temperature controlled crystal oscillator (TCXO) as the reference oscillator.

7. The method of claim 1 wherein during the low power mode, the reference oscillator is used in response to a paging occasion (PO) or a synchronization update.

8. A wireless transmit/receive unit (WTRU) comprising:
   a reference oscillator providing a frequency standard for synchronized communications;
   a real time clock (RTC) operating at significantly less power than the reference oscillator;
   a controller for providing an active mode of operation and a low power mode of operation, whereby the active mode uses the reference oscillator and the lower power mode uses the RTC and selectively uses the reference oscillator; and
   the controller configured to use the reference oscillator during the low power mode to perform a synchronization update, to determine a difference between completion of the synchronization update and a next process requiring use of the reference oscillator and to turn off the reference oscillator if the determined difference is greater than a selected threshold.

9. The WTRU of claim 8 where wireless communication is conducted in formatted timeframes wherein:
   the controller provides a low power mode that includes discontinuous reception (DRX);
   the reference oscillator is a high-power and high-accuracy oscillator;
   the RTC is configured to function as an alternative oscillator in the DRX low power mode; and
   the controller is configured to determine the completion of the synchronization update as the convergence of automatic frequency control (AFC) and frame timing correction (FTC) and to use one timeframe as the selected threshold.

10. The WTRU of claim 8 comprising a temperature controlled crystal oscillator (TCXO) provided as the reference oscillator and wherein the controller is configured to use the TCXO during the low power mode in response to a paging occasion (PO) or a synchronization update.

11. The WTRU of claim 8 wherein the controller is configured to:
   use the reference oscillator during the low power mode to perform cell reselection measurements;
   determine a difference between completion of the cell reselection measurements and a next process requiring use of the reference oscillator; and
   turn off the reference oscillator if the determined difference is greater than a selected threshold.

12. The WTRU of claim 11 where wireless communication is conducted in formatted timeframes wherein the controller is configured to determine the completion of the synchronization update as the convergence of automatic frequency control (AFC) and frame timing correction (FTC) and to use one timeframe as the selected threshold for the difference between completion of the synchronization update and a next process requiring use of the reference oscillator and to use seventeen timeframes as the selected threshold for the difference between completion of the cell reselection measurements and a next process requiring use of the reference oscillator.

13. Method of operating a wireless transmit/receive unit (WTRU), the method comprising:
 establishing a discontinuous reception (DRX) state during which the WTRU operates in a discontinuous reception mode of operation;
 during the DRX state, using a reference oscillator to perform a synchronization update;
 determining a difference between completion of the synchronization update and a next process requiring use of the reference oscillator; and
 turning off the reference oscillator if the determined difference is greater than a selected threshold.

14. The method of claim 13, wherein during the DRX state, the reference oscillator is used in response to a paging occasion (PO) or a synchronization update.

15. The method of claim 13, further comprising:
 using the reference oscillator for synchronized communications in a standard operating state; and
 using a real time clock (RTC) for synchronized communications in the DRX state.

16. The method of claim 15, wherein:
 the reference oscillator functions as a high-power and high-accuracy oscillator;
 the RTC functions as an alternative oscillator in the DRX state; and
 a sleep timer algorithm implements DRX state timing and controls operation of the reference oscillator during the DRX state.

17. The method of claim 13, further comprising:
 during the DRX state, using the reference oscillator to perform cell reselection measurements;
 determining a difference between completion of the cell reselection measurements and a next process requiring use of the reference oscillator; and
 turning off the reference oscillator if the determined difference is greater than a selected threshold.

18. The method of claim 17 where wireless communication is conducted in formatted timeframes wherein the selected threshold for the difference between completion of the cell reselection measurements and a next process requiring use of the reference oscillator is seventeen timeframes.

19. The method of claim 13 where wireless communication is conducted in formatted timeframes, the completion of the synchronization update is the convergence of automatic frequency control (AFC) and frame timing correction (FTC) and the selected threshold is one timeframe.

20. A semiconductor integrated circuit configured for use in a wireless device to control a reference oscillator providing a frequency standard for synchronized communications and a real time clock (RTC) operating at significantly less power than the reference oscillator; the integrated circuit comprising:
 a controller for providing an active mode of operation and a low power mode of operation, whereby the active mode uses the reference oscillator and the lower power mode uses the RTC frequency standard; and
 the controller configured to use the reference oscillator during the low power mode to perform a synchronization update, to determine a difference between completion of the synchronization update and a next process requiring use of the reference oscillator and to turn off the reference oscillator if the determined difference is greater than a selected threshold.

21. The integrated circuit of claim 20 wherein:
 the controller provides a low power mode that includes discontinuous reception (DRX); and
 the controller is configured to determine the completion of the synchronization update as the convergence of automatic frequency control (AFC) and frame timing correction (FTC) and to use one timeframe as the selected threshold.

22. The integrated circuit of claim 20 wherein the controller is configured to control a temperature controlled crystal oscillator (TCXO) as the reference oscillator and to use the TCXO during the low power mode in response to a paging occasion (PO) or a synchronization update.

23. The integrated circuit of claim 20 wherein:
 the controller is configured to:
 use the reference oscillator during the low power mode to perform cell reselection measurements;
 determine a difference between completion of the cell reselection measurements and a next process requiring use of the reference oscillator; and
 turn off the reference oscillator if the determined difference is greater than a selected threshold.

24. The integrated circuit of claim 23 where wireless communication is conducted in formatted timeframes wherein the controller is configured to
 determine the completion of the synchronization update as the convergence of automatic frequency control (AFC) and frame timing correction (FTC);
 use one timeframe as the selected threshold for the difference between completion of the synchronization update and a next process requiring use of the reference oscillator; and
 use seventeen timeframes as the selected threshold for the difference between completion of the cell reselection measurements and a next process requiring use of the reference oscillator.

* * * * *

UNITED STATES PATENT AND TRADEMARK OFFICE
CERTIFICATE OF CORRECTION

| | | |
|---|---|---|
| PATENT NO. | : 7,197,341 B2 | Page 1 of 2 |
| APPLICATION NO. | : 11/000285 | |
| DATED | : March 27, 2007 | |
| INVENTOR(S) | : Bultan et al. | |

It is certified that error appears in the above-identified patent and that said Letters Patent is hereby corrected as shown below:

IN THE DRAWINGS

FIG. 2, item 83 input, line 3, delete "REAL TIMER CLOCK" and insert therefor --REAL TIME CLOCK--.

FIG. 2, item 88 input, line 3, delete "REAL TIMER CLOCK" and insert therefor --REAL TIME CLOCK--.

FIG. 5, item 271 output, line 2, delete "TRIGGERED BY A" and insert therefor --TRIGGERED BY AN--.

FIG. 5, item 272 output, line 2, delete "TRIGGERED BY A" and insert therefor --TRIGGERED BY AN--.

FIG. 7, item 303, line 2, delete "CRTC AND CMC", and insert therefor --$C_{RTC}$ AND $C_{MC}$--.

IN THE SPECIFICATION

Column 1, line 60, after "TCXO (e.g.,", delete "32,768" and insert therefor --32.768--.

Column 2, line 56, after the word "embodiment", delete "a" and insert therefor --an--.

Column 4, line 15, before word "then", delete "is" and insert therefor --are--.

Column 4, line 16, after the word "turn", delete "is" and insert therefor --are--.

Column 7, line 62, after the words "$C_{RTC}$ and $C_{MC}$" delete "using formulars in Equation".

UNITED STATES PATENT AND TRADEMARK OFFICE
CERTIFICATE OF CORRECTION

PATENT NO.       : 7,197,341 B2
APPLICATION NO.  : 11/000285
DATED            : March 27, 2007
INVENTOR(S)      : Bultan et al.

It is certified that error appears in the above-identified patent and that said Letters Patent is hereby corrected as shown below:

IN THE CLAIMS

Claim 24, column 12, line 44, after the word "to", insert --:--.

Signed and Sealed this

Second Day of October, 2007

JON W. DUDAS
*Director of the United States Patent and Trademark Office*